May 21, 1968     S. J. BICE     3,384,741
ILLUMINABLE FRACTURE-RESISTANT BATON
Filed Aug. 25, 1966
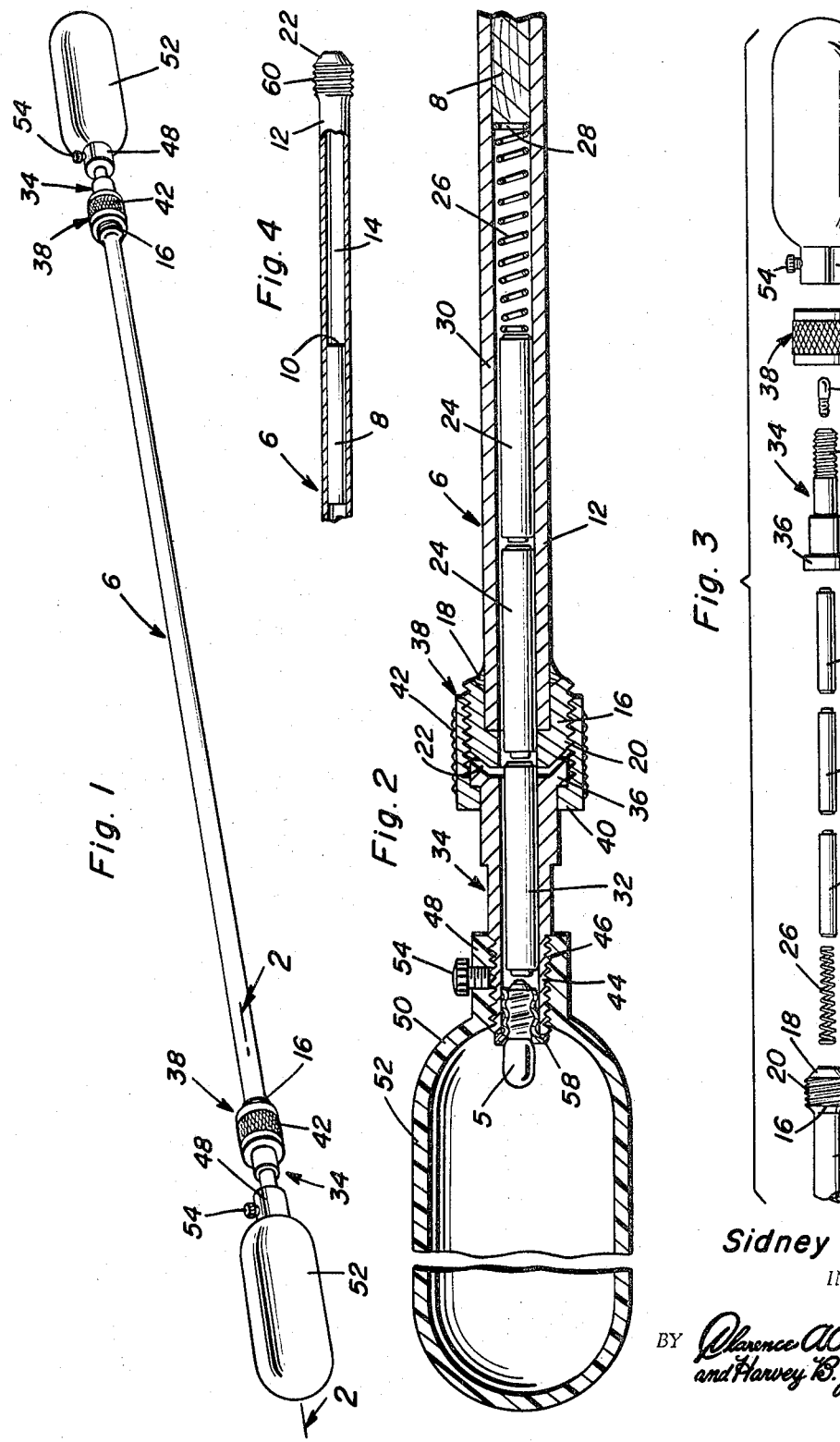
Sidney J. Bice
INVENTOR.

United States Patent Office 3,384,741
Patented May 21, 1968

3,384,741
ILLUMINABLE FRACTURE-RESISTANT BATON
Sidney J. Bice, 149 Alpha Drive,
Eau Gallie, Fla. 32935
Filed Aug. 25, 1966, Ser. No. 575,168
5 Claims. (Cl. 240—6.42)

ABSTRACT OF THE DISCLOSURE

This baton is fracture-resistant and virtually unbreakable when dropped. It is adapted to replace unsafe batons having dangerous fire-heads at the respective ends of the handling shaft. It is safe and feasible for use by twirlers on stage or inside of homes and buildings. It is attractive for parading, tossing and twirling and for festive handling. It embodies a hollow wand having illuminable globes removably mounted on the opposite end portions by novel coupling means. Repeated experimental use has shown that the baton is an innovation and well serves the purposes for which it is intended.

---

This invention relates to certain new and useful improvements in a baton which is such in character, construction and purpose that it lends itself to thrilling eye-appealing but reliable service and use by beginners as well as long-experienced twirlers, is intended to take the place of unsafe actual fire-type wands and batons, and is destined to do so in that the desired illuminating and lighting effect is safely achieved by simple enclosed lamp bulbs which use in artificial light source (flashlight batteries) for illumination.

It is of paramount importance that promoting the safe and sane aspect of the concept gave rise to the herein disclosed desire to replace perilous batons wherein blazing and dangerous fire-heads at the ends of the shaft serve for spectacularly attractive and thrill-producing effects. To the ends desired, the baton which is the subject matter of the instant invention is adapted for over-all entertainment for twirlers and spectator observers but is uncomparably safer when used on stage or inside of homes and buildings. It is capable of easy balanced handling for dazzling eye-appeal effects and well serves its customary flashy purposes for parading, tossing and twirling, festive juggling, for football rallying and school games and for any and all occasions where illuminable batons are regularly used for entertainment.

Of equal if not greater importance is that phase of the concept wherein the improved adaptation is long lasting, even with hard use and is virtually damage-proof and unbreakable when it is repeatedly dropped on the floor, ground or similar and usually unyielding surface.

In carrying out the desired principles of the over-all inventive concept commercially and otherwise several of the component parts are uniquely constructed and featured. One improvement resides in the provision of a stainless steel smooth-surfaced shaft which is of suitable length, say from 15 to 28 inches but usually about 26 inches in length. Wooden or equivalent dowels are friction-fitted and lodged inwardly of the respective ends of the hollow portion of the shaft and provide end thrust shoulders for coacting coil springs. Each coil spring serves to coact in an end thrust direction with an adjacent one of several suitable flashlight batteries. In addition the respective outer end portions of the shaft are provided with screw-threaded collars which serve as adapters, more specifically male coupling members.

Further novelty is predicated on a suitably knurled nut which is swively mounted on a flanged end of an axially aligned sleeve, said sleeve being provided at its flanged end with a swively mounted cup-like nut which constitutes an internally screw-threaded female coupling member, whereby to permit both coupling members to be separably but satisfactorily joined together.

Novelty in addition is predicated on screw threading an outer end of the sleeve to provide a nipple, the nipple being screwed into a screw-threaded neck provided therefor on an inner coacting end of a transparent plastic or equivalent globe or shade for the lamp bulb, the lamp bulb carried by said nipple.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an illuminable fracture-resistant baton constructed in accordance with the principles of the invention and readied for use.

FIG. 2 is an enlarged view partly in section and partly in elevation showing the left hand end portion of the over-all baton, said view being taken on the plane of the section line 2—2 of FIG. 1.

FIG. 3 is an exploded elevational view of the right hand end portion which, as will be hereinafter more clearly evident, corresponds in construction with the enlarged assembled left hand portion appearing in FIG. 2.

And FIG. 4 is a view in section and elevation of the specially constructed end portion of the shaft.

Taking up first the baton tossing and handling means, this is characterized, generally speaking, by a tubular shaft 6. This shaft is usually, but not necessarily, about 26 inches long and is made of stainless steel. While it is within the purview of the invention to extend the insertable dowel from approximately one end to the other of the hollow portion, it is preferred that the left hand end portion and right hand end portion, respectively, be equipped with a dowel as at 8 whose outer end 10 is spaced from the corresponding outer end portion 12 so that the space thus provided constitutes and provides a socket 14 which serves a purpose to be hereinafter more specifically set forth. Incidently, both end portions of the shaft are the same in construction and, in fact, each terminal end portion is provided with an enlarged adapter collar of the type denoted at 16 in FIG. 2. The collar is fitted over the terminal end portion, is welded or otherwise fixed in place as at 18, has external screw threads at 20 and has a terminal beveled end as at 22 (FIG. 2). This collar-equipped socketed end portion serves to accommodate end-to-end flashlight batteries 24, two of which are located in the socket in proper coordinating relationship. The battery at the right in FIG. 2 also coacts with a coil spring 26 which is confined in the socket and has an enlarged coil 28 which is tight-fitted and abuts an adjacent end of the insert or dowel 8. This over-all structurally unique end portion (the outer end portion in each instance) is denoted generally by the numeral 30 in FIG. 2. As stated since both ends are the same a description of FIG. 2 will continue and will suffice to set forth this unique shaft-end.

There is a third flashlight battery which is denoted at 32 and which is primarily contained in the bore of a globe mounting and connecting member which is referred to broadly as a connector 34 and more specifically as a sleeve. The inward or right hand end portion of the sleeve is provided with an outstanding flange 36 which has an internal bevel providing a seat for the aforementioned annular bevel 22. This flange also serves to swivelly mount a cup-like assembling and adjusting nut which is denoted at 38. The nut has its flange end portion 40 swivelled and held in place. The exterior surface is suitably knurled as at 42 to provide a finger grip. The interior flange is internally screw threaded and is joined with the threads 20 on the adapter collar 16. Thus the two components are screw threaded and joined together. The collar 16 may be regarded as a male coupling member and the nut as a female coupling member, the two being assembled and cooperating in the manner clearly evident in FIG. 2. The left hand or outer end of the sleeve is slightly reduced and screw threaded to provide a nipple 44 which is screwed into the screw-threaded bore 46 of a reduced neck 48 on the inner end portion 50 of an elongated bulbous transparent (suitable plastic) globe or shade 52. If desired a setscrew 54 may be provided on the neck and used to assist in joining the neck 48 to the nipple.

It will be evident that the nut 42 and adapter collar 16 serve not only to partly accommodate the spring-biased flashlight batteries 24 and 32, they provide a satisfactory means whereby the user can switch the lamp bulb or light off and on. The bulb is here shown at 56 and is of a suitable size and intensity and its base is screwed into a receptacle or socket 58 which in turn is fitted in the bore of the nipple so that the contact point is properly oriented with the contact point of the adjacent battery 32.

It is reiterated that the aforementioned insert or dowel 8 is intended to be driven into place and is thus lodged and friction held to provide an end thrust abutment for the adjacent end of the coil spring 26. The coil spring 26 is of the shape and size shown, relatively speaking, in FIG. 2 and rests upon and is held partly in place by the insert or dowel. This spring constitutes the means to provide the ground between the batteries and shaft which will of course light the lights. The light is shown off in FIG. 2 and by tightening the nut and screwing the components 38 and 16 together, the spring-loaded batteries come into play to illuminate the lamp bulb. In other words, when the nut is tightened the bulb in each end will light up.

It will be understood that this construction provides a fracture-resistant baton which is substantially unbreakable if and when dropped.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A baton comprising: an elongated wand-like handling and twirling shaft, a transparent globe situated at at least one end of said shaft, means operatively mounting said globe on said one end, said means embodying a battery illuminable bulb and manually controllable mechanically actuated batteries for electrically lighting and extinguishing said bulb, and said bulb being localized for use within the confines of said globe, the opposite end of said shaft being provided with means corresponding to said first-named means and which likewise embodies a battery illuminable bulb and batteries therefor, a transparent globe carried by said means and operably confining said bulb, and wherein said shaft is hollow and the means operatively mounting said globe at each end of said shaft is characterized by a shaft and globe assembling and uniting sleeve interposed between and axially aligned with said shaft and globe, respectively, said sleeve having an outer end separably joined to an adjacent inner end of said globe and an inner end separably and adjustably joined to an outer end of said shaft, said batteries being arranged end to end and confined for shiftable operation in the bore of said sleeve and a cooperating hollow end portion of said shaft, and wherein said globe is of elongated bulbous form and is provided at said inner end with a reduced screw-threaded neck, the outer end of said sleeve being screw threaded to provide a nipple and said nipple being screwed into and thus detachably joined with said neck, the outer end of said shaft having an adapter thereon, the contiguous inner end of said sleeve having a swivelled connector united with said adapter, and wherein said adapter comprises an externally screw-threaded ring-like collar fixed on and projecting axially beyond said shaft with its outer end chamfered and providing an annular bevel, and said connector comprising an internally screw-threaded cup-like nut which is screwed in place on said collar.

2. An illuminable fracture-resistant baton for exhibition twirling, parading, entertainment and displace purposes comprising: an elongated stainless steel wand-like handling and twirling shaft, said shaft being hollow and provided at one end thereof with a friction-fitted insert constituting an end thrust abutment, the outer end of said abutment being spaced inwardly from an adjacent outer end of said shaft, the outer end of said shaft being provided with a permanently attached externally screw-threaded collar, said collar constituting a male coupling member and an adapter, an elongated sleeve axially aligned with said adapter collar, the end of said sleeve adjacent said collar being provided with an outstanding nut assembling and swivelling flange, a nut having a flanged end encircling said sleeve and swivelly abutting said flange, said nut being internally screw threaded and providing a female coupling member and said male coupling member being telescopingly and adjustably mounted within the threaded portion of said nut, a lamp enclosing globe provided at an inner end with an internally screw-threaded neck, the adjacent end portion of said sleeve being screw threaded and providing a nipple and said nipple being screwed into said neck, said nipple being provided with an attachable and detachable lamp bulb and said lamp bulb being confined within the interior space of said globe.

3. The structure according to claim 2, and, in combination, a plurality of flashlight batteries mounted in the hollow portion of said shaft and bore of said sleeve respectively, one battery having a contact which is proximal to the coacting contact-end of said lamp bulb, and a coil spring in the hollow portion of said shaft interposed between an adjacent one of said batteries and an adjacent end portion of said insert.

4. The structure defined in claim 3, and wherein the outer end of said collar is chamfered to provide an annular bevel, and also wherein the flange on said sleeve is adjacent to said bevel and is within the confines of the threaded portion of said nut and is also provided with a concave bevel for coaction with said first-named bevel.

5. An illuminable fracture-resistant baton comprising: an elongated hollow shaft providing a wand, the hollow portion of said shaft being provided at at least one end with an insert spaced inwardly from an adjacent outer end of the shaft and constituting an end-thrust abutment for a coil spring, the outer end of said shaft being provided with a collar constituting a male coupling member, an elongated sleeve axially aligned with said collar, said sleeve being provided with an assembling and swivelling flange, a coupling member having a flange encircling said sleeve and swivelly abutting said flange and providing a female coupling member, said male coupling member being telecopingly and adjustably mounted within the confines of and retained in place by said female coupling member, a lamp enclosing globe provided at an inner end with an attaching and retaining neck, the adjacent end of said sleeve constituting a nipple and being telescopingly fitted and retentively mounted in said neck, said nipple being adapted to retentively support an attachable and detachable lamp bulb which when in use is confined within the interior space of said globe, a plurality of flashlight batteries mounted in the hollow portion of said shaft and the bore of said sleeve respectively, one battery having a contact proximal to the coacting contact-end of said lamp bulb, and a coil spring confined in the hollow portion of said shaft and interposed between an adjacent one of said batteries and an adjacent coacting end portion of said insert.

References Cited
UNITED STATES PATENTS

| | | | |
|---|---|---|---|
| 2,242,981 | 5/1941 | Pedersen | 240—6.42 |
| 2,259,443 | 10/1941 | Geier | 240—6.42 |
| 2,681,979 | 6/1954 | Manoloff | 240—6.42 |

NORTON ANSHER, *Primary Examiner.*

J. W. PRICE, *Assistant Examiner.*